US006456599B1

(12) United States Patent
Elliott

(10) Patent No.: US 6,456,599 B1
(45) Date of Patent: Sep. 24, 2002

(54) DISTRIBUTION OF POTENTIAL NEIGHBOR INFORMATION THROUGH AN AD HOC NETWORK

(75) Inventor: Brig Barnum Elliott, Arlington, MA (US)

(73) Assignee: Verizon Corporate Services Group Inc., New York, NY (US)

( * ) Notice: Subject to any disclaimer, the term of this patent is extended or adjusted under 35 U.S.C. 154(b) by 0 days.

(21) Appl. No.: 09/499,842

(22) Filed: Feb. 7, 2000

(51) Int. Cl.[7] ................................................ H04Q 7/20
(52) U.S. Cl. ........................ 370/254; 455/445; 455/519
(58) Field of Search ................................. 370/254, 255, 370/310, 312, 238; 455/445, 519

(56) References Cited

U.S. PATENT DOCUMENTS

| | | | |
|---|---|---|---|
| 4,718,002 A | 1/1988 | Carr | 364/200 |
| 5,093,824 A | 3/1992 | Coan et al. | 370/16 |
| 5,243,592 A | 9/1993 | Perlman et al. | 370/17 |
| 5,574,860 A | * 11/1996 | Perlman et al. | 395/200.06 |
| 5,850,592 A | 12/1998 | Ramanathan | 455/7 |
| 5,881,246 A | 3/1999 | Crawley et al. | 395/200.68 |
| 5,913,921 A | 6/1999 | Tosey et al. | 709/220 |
| 5,949,760 A | * 9/1999 | Stevens et al. | 370/254 |
| 6,130,881 A | * 10/2000 | Stiller et al. | 370/238 |
| 6,134,442 A | * 10/2000 | Borst et al. | 455/445 |

OTHER PUBLICATIONS

"Link–State Routing," John Moy, Ch. 5, "Routing in Communications Networks," ed. Martha Steenstrup, Prentice Hall, 1995.

"Packet Radio Routing," Gregory S. Lauer, Ch. 11, "Routing in Communications Networks," ed. Martha Steenstrup, Prentice Hall, 1995.

"Packet Radio Network Routing Algorithms: A Survey," J.J. Hahn et al., IEEE Communications Magazine, vol. 22, No. 11, Nov. 1984, pp. 41–47.

"The Organization of Computer Resources into a Packet Radio Network," R.E. Kahn, IEEE Trans. On Communications, vol. COM–25, No. 1, Jan. 1977, pp. 169–178.

"Analysis of Routing Strategies for Packet Radio Networks," J.J. Garcia Lune Aceves et al., Proc. Of the IEEE INFOCOM '85, Washington, DC, Mar. 1985, 292–302.

"The DARPA Packet Radio Network Protocols," J. Jubin et al., Proc. Of the IEEE, vol. 75, No. 1, Jan. 1987, pp. 21–32.

* cited by examiner

Primary Examiner—Min Jung
(74) Attorney, Agent, or Firm—Leonard Charles Suchyta; James K. Weixel

(57) ABSTRACT

A communication network includes plural nodes capable of receiving and issuing messages. Each node has actual neighboring nodes to which it is connected. At each node, network information is received from other nodes of the network. Information of potential neighboring nodes to which the node could possibly be connected is generated in the node in response to the network information received from other nodes of the network. A network information message issued from the node to the other nodes of the network that includes information of the potential neighboring nodes.

26 Claims, 11 Drawing Sheets

DISTRIBUTION OF POTENTIAL NEIGHBOR INFORMATION THROUGH AN AD HOC NETWORK

BACKGROUND OF THE INVENTION

1. Field of the Invention

The present invention relates generally to an apparatus and method for network communication, and more particularly to network node arrangements that gather information regarding neighboring nodes and distribute the information regarding. the neighbors throughout the network.

2. Related Art

In "ad hoc" networks, as opposed to conventional networks, a given node typically finds itself with "potential neighbor" nodes with which it can directly communicate, but which are not predefined or currently linked with the node. The given node also finds itself with "actual neighbor" nodes, which are predefined or currently linked with the given node. With conventional technology, each node forms neighbor relationships with every such potential neighbor node by promoting the potential neighbor node to an actual neighbor node. This promotion scheme is explained with reference to FIG. 2A. As shown in FIG. 2A, reference letters A-E represent network gateway nodes (e.g., network access points). A network "backbone" is formed through gateway links. Reference letters a–g represent member nodes, which gain network access through a gateway. As illustrated, members a–d gain network access through gateway A. Similarly, members e–g gain network access through gateway E.

As illustrated, node A has an actual neighbor gateway link with each of nodes C and E. The dashed lines between nodes A and B, and between nodes A and D indicate potential neighbor relationships. Under current routing protocols, each node forms neighbor relationships with each such potential neighbor node by promoting the potential neighbor node to an actual neighbor node. Under current protocols, node A will necessarily promote nodes B and D to be actual (or "full") neighbor nodes.

For many routing protocols, however, promoting each potential neighbor into an actual neighbor greatly increases control traffic within the network. The increased traffic can be particularly burdensome in those networks, for example radio-based networks, where bandwidth is at a premium. Describing all existing neighbor relationships and their varying metrics while the links between neighbors change consumes a tremendous amount of the limited bandwidth.

In current network systems, either all potential neighbors are adopted as actual neighbors or a local determination is made (e.g., on the basis of received signal strength) as to which potential neighbor should be adopted as an actual neighbor. However, information on potential neighbors is not distributed throughout conventional networks.

It may be desirable for a given node to form only a subset of possible neighbor relationships, and to advertise only that subset through network traffic. The selection of the subset is difficult, however, and local choices (e.g., when a node selects its own neighbors from a set of potential neighbors only on the basis of locally available information) can cause globally sub-optimal choices. An object of this invention, therefore, is to provide a method and apparatus to distribute some or all of the "potential neighbor" information so that nodes in a network can perform globally optimal selections of actual neighbors from potential neighbor sets.

SUMMARY OF INVENTION

The present invention relates to a distribution of neighbor information through an ad hoc network.

According to the invention, a communication network has plural nodes capable of receiving and issuing messages, each node having neighbor nodes including actual neighboring nodes. Network information is received at a node, from other nodes in the network.

According to one aspect, the present invention relates to generating in a communication node, information of potential neighboring nodes responsive to the received network information from other nodes of the network, and issuing a network information message from the node to the other nodes of the network, which network information message includes information of the potential neighboring nodes.

According to another aspect, the potential neighboring node information includes a node identifier for the node, a node specific sequence number for the node and a list of potential neighbors of the node.

In yet another aspect, the information for each potential neighboring node includes a metric corresponding to a cost of linking the potential neighbor and the node. The information for each potential neighboring node can also include a metric corresponding to a serviceability of a link between the potential neighbor and the node.

Yet another aspect of the present invention is that the network information message which includes the information of potential neighboring nodes is issued from the node less frequently than other network information messages. The network information message of potential neighboring nodes can also be issued in response to an occurrence of a predetermined event. A predetermined event can include at least one of the nodes realizing a change in the potential neighbors, a change in a state of a potential neighboring node, and an occurrence of a predetermined time-period.

In still another aspect, the network information messages of the node are issued to the actual neighboring nodes for reissuance to other nodes of the network.

Yet another aspect includes storing network topology information in the node, processing the received network information messages including the information of potential neighboring nodes to modify the network topology information, and issuing network information messages including the network topology modifying information. The network topology modifying information can include information corresponding to network reconfiguration. The network reconfiguring information can also include at least one of changing potential neighboring nodes to actual neighboring nodes and changing actual nodes to potential neighboring nodes.

According to one embodiment, a method of operating a mobile station for use in a wireless mobile communication network is provided. The network employs a plurality of mobile stations, each of the plurality of stations being capable of transmitting and receiving communication signals. The method includes the steps of: (i) receiving at the mobile station, network information from other stations in the network; (ii) generating in the mobile station, information of potential neighboring stations responsive to the received network information from other stations of the network; and (iii) issuing a network information message from the mobile station to the other stations of the network, which network information message includes information of the potential neighboring stations.

According to another embodiment, a programmable computer for use in operating a communication node in an ad hoc communication network is provided. The communication node is capable of issuing and receiving messages, each node having neighboring nodes including actual neighboring nodes. The programmable computer includes at least one memory including at least one region for storing computer executable program code, and a processor for executing the program code stored in the memory. The program code includes: (i) code to receive at the node, network information from other nodes in the network, (ii) code to generate in the node, information of potential neighboring nodes responsive to the received network information from other nodes of the network, and (iii) code to issue a network information message from the node to the other nodes of the network, which network information message includes information of the potential neighboring nodes.

In another embodiment, a network node apparatus includes a memory, a processor and a transmitter. The memory stores link-state information regarding neighboring nodes in a network. The processor (i) determines a list of potential neighbor nodes, and (ii) determines cost-of-transaction information regarding each node on the list of potential neighbor nodes. The transmitter transmits the list of potential neighbor nodes and the determined cost-of-transaction information to the network.

In still another embodiment, computer executable code stored on a computer readable medium is provided. The code operates a communication node in a communication network having plural nodes capable of receiving and issuing messages, each node having neighboring nodes including actual neighboring nodes. The code includes: (i) code to receive at the node, network information from other nodes in the network; (ii) code to generate in the node, information of potential neighboring nodes responsive to the received network information from other nodes of the network; and (iii) code to issue a network information message from the node to the other nodes of the network, which network information message includes information of the potential neighboring nodes.

In still another embodiment, a network node apparatus includes means for storing, means for determining, and means for transmitting. The storing means stores link-state information regarding neighboring nodes in a network. The determining means determines a list of potential neighbor nodes and cost-of-transaction information regarding each node on the list of potential neighbor nodes. The transmitting means transmits the list of potential neighbor nodes and the determined cost-of-transaction information to the network. These and other objects, features and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

DETAILED DESCRIPTION OF THE PREFERRED EMBODIMENTS

Ad hoc wireless networks simplify routing and minimize routing traffic by organizing nodes (e.g., network members) into groups called clusters. In radio-based networks, for example, the network can be formed by arranging a plurality of mobile communications stations into a hierarchical configuration including clusters, with each cluster having a cluster head. One example of a radio-based communications network having clusters is disclosed in U.S. Pat. No. 5,850, 592, issued to S. Ramanathan on Dec. 13, 1998, and assigned to the same assignee.

Figure 2A:
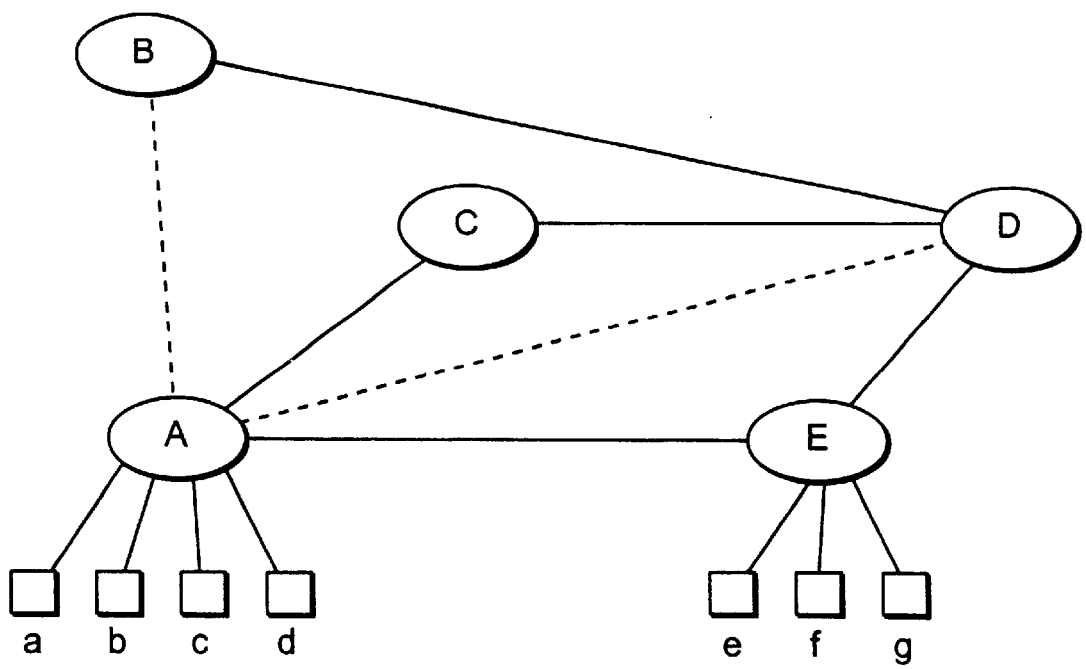
FIGS. 2A–2C are diagrams illustrating possible configurations of an ad hoc network, each showing potential neighbors as well as actual neighbors.

With reference to FIG. 2A, one illustrated cluster includes nodes A, a, b, c and d, with node A serving as the cluster head. Similarly, members E, e, f and g, with node E serving as the cluster head, define another illustrated cluster. Nodes B, C and D are each considered individual cluster groups, as well as cluster heads for their respective group.

Figure 2B:
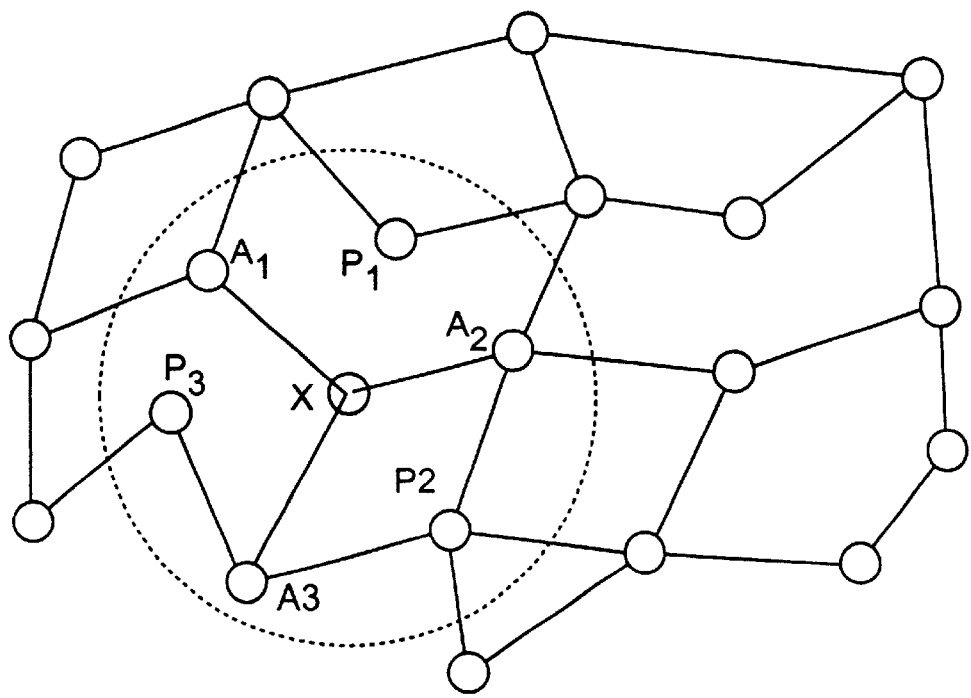

Another possible network configuration is illustrated in FIG. 2B. FIG. 2B shows network nodes (e.g., the "circles"), with communication "links" (e.g., the solid connecting lines) indicating actual neighbor relationships. With respect to node X, nodes $A_1$, $A_2$, and $A_3$ are actual neighbors with X. The range of X=s radio is indicated by the dash-line circle. Nodes $P_1$, $P_2$, and $P_3$ are potential neighboring nodes to node X.

Figure 11:
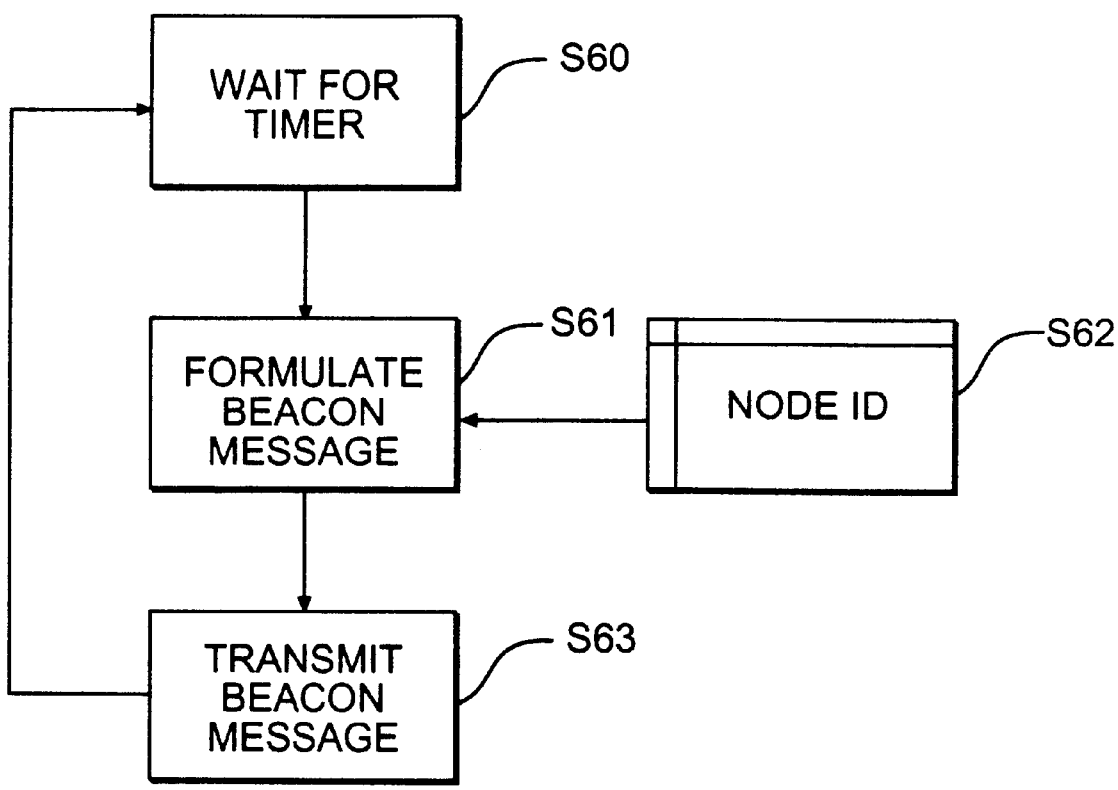
FIG. 11 is a flowchart illustrating a procedure for transmitting a messaging beacon.

Every node in an "ad hoc" network preferably has some means of discovering potential neighbor nodes, and of forming full neighbor relationships with these nodes. In a radio-based network, a cluster head periodically broadcasts a beacon message to establish the station's presence and its availability as a cluster head. FIG. 11 illustrates a process for transmitting beacon messages. A predetermined time is allowed to elapse (S60), and then a node formulates a beacon message (S61). After the beacon message is formulated, it is transmitted in step S63. The beacon message may contain address or node-identifying information, affiliation information, and communication protocol information, for example (S62). While the content of the beacon message may vary, it is important that the beacon contain at least the transmitting node's ID, which is a unique identifier for that node.

Figure 2C:
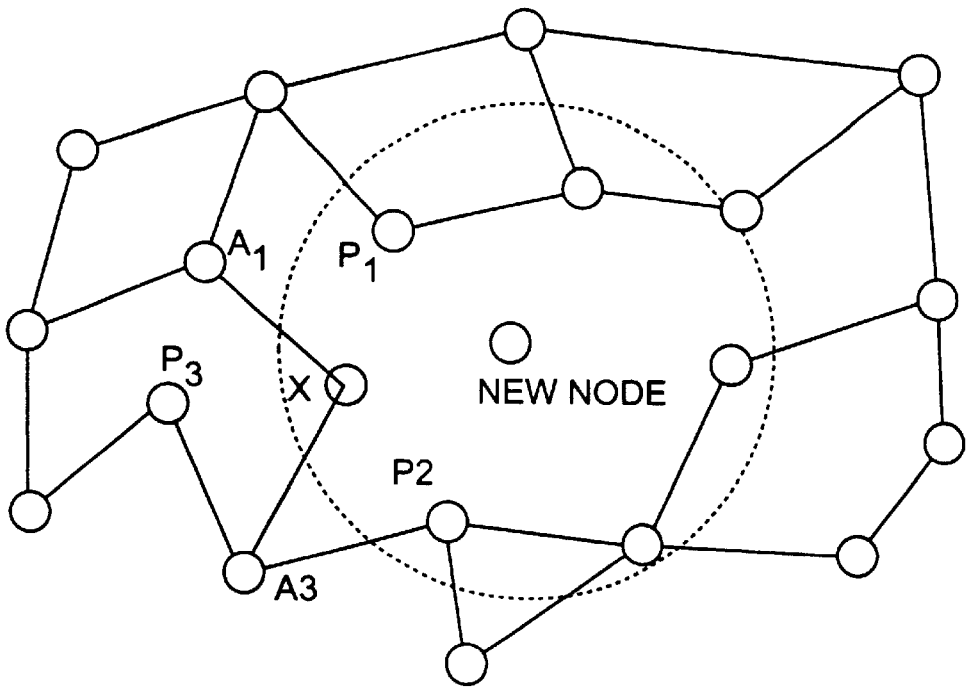

FIG. 2C illustrates a network configuration where a "New Node" is introduced. The New Node's radiobroadcast range is indicated by the dash-line circle. The New Node announces its presence by transmitting beacon messages on a broadcast radio channel. Each node in a network monitors for such message beacons. X recognizes the New Node as a potential neighbor when X receives the New Node's beacon message. X can then determine whether to promote the New Node to an actual neighbor, as discussed below. In link-state routing protocols, each node distributes a list of its actual neighbor nodes, along with a link metric from itself to the actual neighbor nodes, to other nodes in the network. This information is used to build a full "map" of the network topology in each distributed node. From this information, how messages/packets should be forwarded through the network can be derived.

In classic link-state routing, there is one basic type of routing update that is issued by a network node—a "link state" update. In such an update, the node reports its identity, a node-specific sequence number, and a variable-size list of neighboring nodes to which it has operational links, along with the metrics for those links. A full neighbor relationship between two nodes requires a fair amount of work. For example, the nodes must exchange a series of control messages, create updates to describe the new link, flood these updates through the network, and continually probe the network link to assess current capacity and reliability.

The present invention introduces a second, parallel type of update (e.g., a "potential neighbor update"). A potential-neighbor update can include the following fields: a node identifier, a node-specific sequence number, and a list of potential neighbors. Each potential neighbor field preferably contains two subfields: the node identifier of the potential neighbor, and a metric that describes the cost (or "serviceability") of the link between that potential neighbor and the node issuing the update. The subfield may also contain the "transitional" cost of setting up and/or tearing down this neighbor relationship.

Preferably, potential neighbor updates are issued on an event-driven basis. An "event" can be any number of occurrences, including a change in a node's set of potential neighbors, or on a periodic basis to refresh the existing information within the network. A node would thus upgrade a subset of its potential neighbors to actual neighbors, and issue potential-neighbor updates regarding the remaining potential neighbors. The potential-neighbor updates would in general be transmitted at a slower rate than the updates for full neighbors, in order to reduce the volume of control traffic through the network. Alternatively, the potential neighbor list may be "piggy backed" into the same updates as those for full neighbors, or the updates could be issued more often.

Each potential neighbor update can be managed via a classic link-state method, namely, replacement of older updates via newer ones, reliable flooding, aging out of updates, etc. The classic methods are used to compute best-path trees between nodes with full neighbor relationships (e.g., Dijkstra's algorithm for Shortest Path First forwarding). Dijkstra's algorithm assigns a cost between each link in a network. For example, a cost (or "metric" as discussed below) would be assigned between nodes A and C and node A and E in FIG. 2A. The algorithm then produces a set of shortest paths from the calculating node to all other nodes in the network. The cost of a routing path is the sum of the costs of the links making up the path. With reference to FIG. 2A, the cost of forwarding a message from node A to node B, is the sum of the costs of the links between nodes A and C, C and D, and D and B. The alternative cost would be the sum of the cost of the links between nodes A to E, E to D, and D to B. Dijkstra's algorithm determines which path has the lowest cost. A detailed description of Dijkstra's algorithm can be found in Chapter 5 of "Routing in Communications Networks," M. Steenstrup, ed., 1995.

As will be appreciated, alternative methods can be employed to determine the possible network topologies that would arise should any or all potential neighbor relationships be upgraded to actual neighbor relationships.

If the network performance would be improved by updating one or more potential neighbor relationship into an actual neighbor relationship, the nodes could automatically act to perform such upgrades. These actions might be accomplished via a distributed computation. For instance, every node has a complete map of the current and potential network topology and could independently perform these upgrades so as to improve the overall network map (e.g., reduce a network graph diameter, increase robustness by providing multiple connectivity, etc.).

Alternatively, one or more individual nodes in response to locally perceived needs could cue these actions. For instance, if a node noticed a heavy flow of messages along a network path that could be handled more efficiently if the network topology were slightly adjusted, it could send a message to the affected nodes requesting them to upgrade their potential neighbor relationships to actual neighbor relationships. Network nodes can also upgrade neighbor relationships in advance of predicted traffic flows. Similarly actual relationships could be downgraded to potential relationships should the actual relationships prove nonessential in the overall network map.

The present invention extends classic link-state routing to allow full or partial distribution of "potential," as well as "actual," network topology throughout the network, and gives a basis for decentralized, distributed, or centralized algorithms to influence which such potential neighbor relationships should be upgraded to full neighbor relationships. Using only a subset of possible neighbor relationships can lead to a reduced amount of control traffic, and thus fewer transmissions of control traffic, better overall network throughput, less power usage, and so forth.

Figure 1:
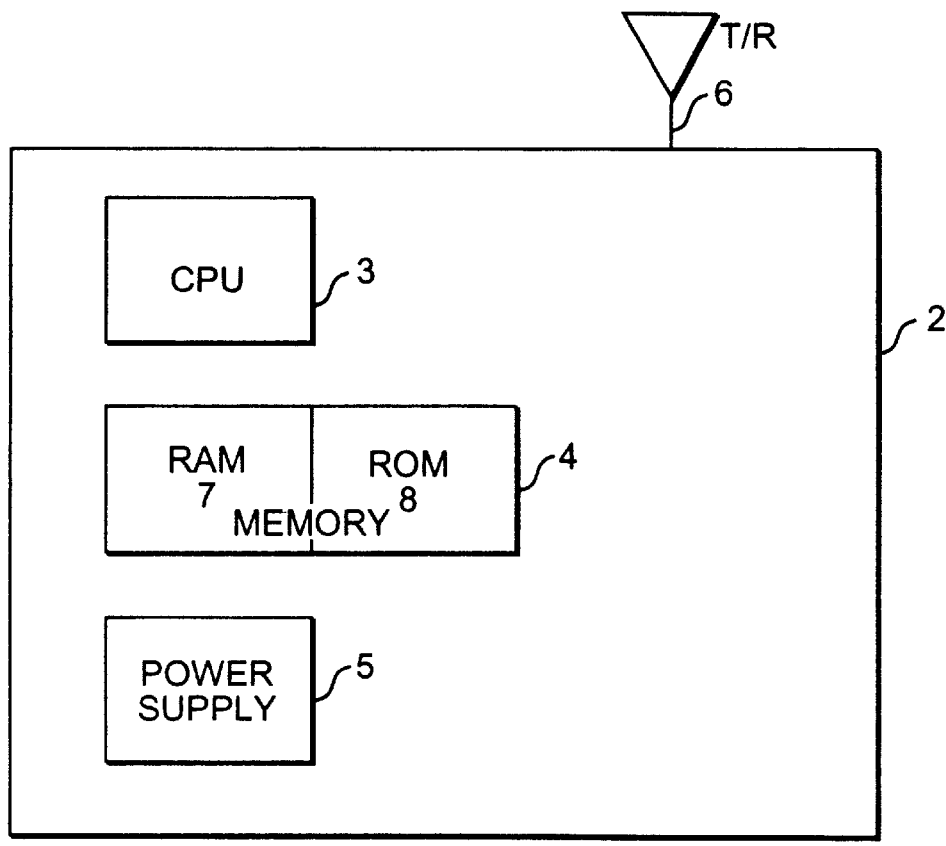
FIG. 1 is a block diagram of a communication node.

A communication node 2 is shown in FIG. 1. The node 2 includes a central processing unit (CPU) 3, a memory 4 suitable for storing computer executable software therein, a power supply 5, a transceiver 6, RAM 7 and ROM 8. Alternatively, the node 2 may include more than one transmitter and/or more than one receiver. The communications node 2 can also include an Ethernet interface, as well as other interfacing ports. In a radio-based network, the communications node 2 is a mobile radio station.

To route messages over a network, each node maintains information (e.g., a database) regarding the network topology. A network topology is defined by a series of "snapshots" which are issued from each node in the network. In the ad hoc network shown in FIG. 2A, snapshots can be routed or flooded through the network by the cluster heads. Preferably, there are two types of snapshots: link-state and affiliation. Link-state snapshots are issued by a cluster head, for example, when: i) its set of backbone links change; ii) its metrics to one of its backbone links or cluster member changes; and iii) periodically to ensure that old, aged-out snapshots are replaced by new, fresh snapshots.

Figure 6A:
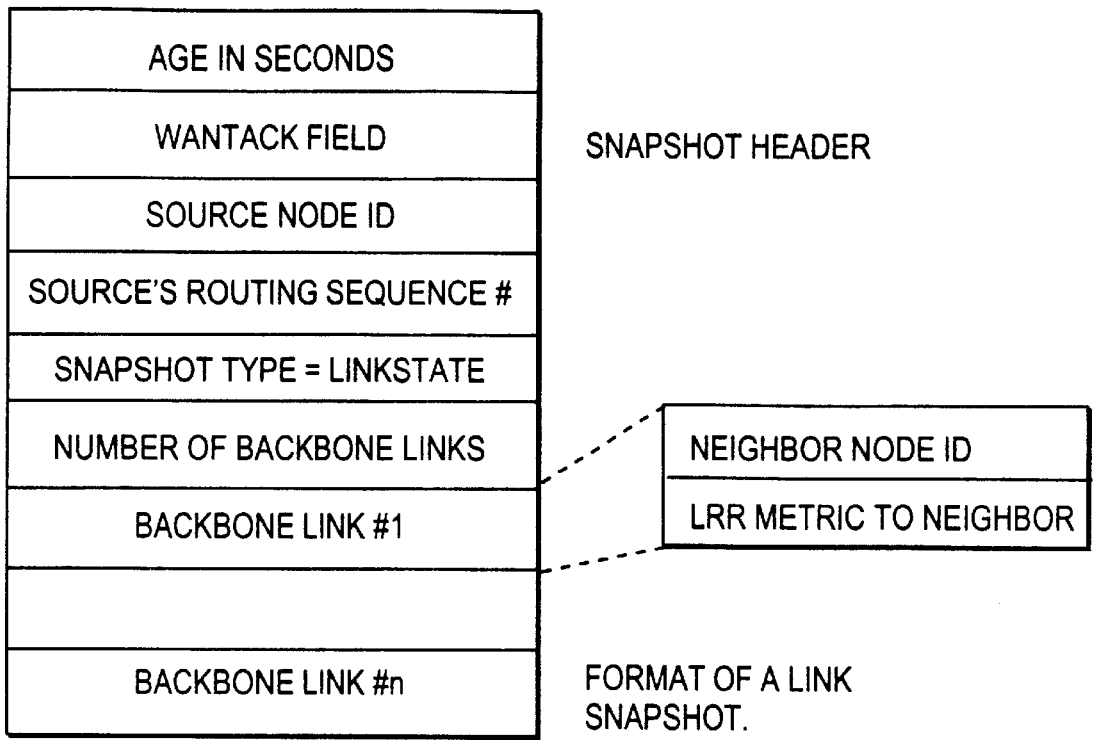
FIGS. 6A and 6B are diagrams illustrating, respectively, formats of link-state and affiliation snapshots.

FIG. 6A is a diagram showing a format of a link-state snapshot, without potential neighbor information. Possible fields include Age in Seconds, WantAck, Source Node ID, Source's Snapshot Sequence Number, Snapshot Type, Number of Backbone Links and Backbone Link entry. The Age in Seconds field gives the estimated age of the snapshot in seconds. This estimated age is used primarily for aging snapshots out of a database when they become "too old" to be trusted. "Too old" is determined by many factors, including a comparison against a predetermined time, or a comparison to a frequency of updates for other snapshots, for example. The WantAck field is a request for an acknowledgment of receipt of the snapshot from other cluster heads. Receiving acknowledgments assists the issuing cluster head with various transmission or network-flooding procedures. The Source ID is a unique identifier or node-address for the issuing cluster head.

The Source's Snapshot Sequence Number is a unique sequence number that identifies the position of the snapshot within the stream of snapshots emanating from the issuing cluster head. This sequence number is used to determine whether one snapshot is newer than another. A cluster head may receive several copies of the same snapshot from several different neighboring cluster heads. In this case, the sequence number identifies that the repetitive snapshot is the same update. Furthermore, it is possible that a snapshot could be delayed by network congestion and arrive at a cluster head later than a newer snapshot. The sequence number enables a cluster head to ignore stale snapshots.

The Snapshot Type field distinguishes between link-state snapshots and affiliation snapshots. This field is set to indicate a link-state snapshot when it is issued from the cluster head. As its name suggests, the Number of Backbone Links field indicates how many backbone links are in service from the issuing node to its cluster head neighbors. This field also identifies the number of Backbone Link entries contained within the snapshot.

Each Backbone Link field conveys information about one of the in-service links from the issuing cluster head to an affiliated (or connected) cluster head. The field preferably contains the affiliated cluster head's node or address ID and the most up-to-date metric (as discussed below) from the issuing cluster head to the affiliated cluster head.

Figure 6B:
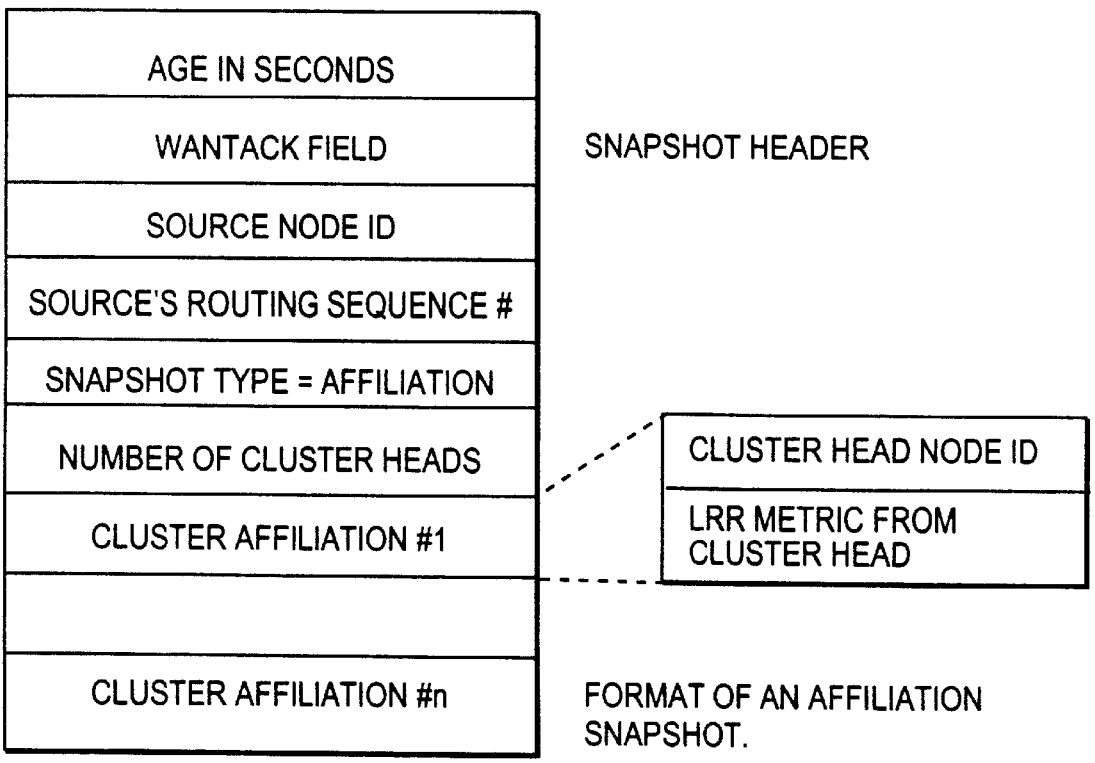

An affiliation snapshot, as shown in FIG. 6B, is issued by a cluster member. A cluster member can issue the affiliation snapshot when it changes its cluster affiliation (e.g., moves from one cluster to another), and periodically to ensure that old, aged-out snapshots are replaced by new, fresh ones. Possible fields include Age in Seconds, WantAck, Source Node ID, Source's Routing Sequence Number, Snapshot Type, Number of Cluster Heads and Cluster Affiliations.

The Age in Seconds, WantAck, Source Node ID, and Source's Snapshot Sequences Number are similar to those described above with respect to the link-state snapshot. The Snapshot Type field is set to indicate an Affiliation Snapshot emanating from a cluster member.

The Number of Cluster Heads field indicates how many clusters the issuing cluster member is currently affiliated with and identifies the number of Cluster Affiliation entries contained within the snapshot. Each Cluster Affiliation entry conveys information about one of the clusters to which the issuing cluster member belongs. Preferably, each entry includes the cluster head's node ID and the most up-to-date metric from that cluster head to the issuing cluster member.

A snapshot database can be maintained either by each node in a network, or by only the cluster heads in the network. The database includes both link-state and affiliation snapshots. In this manner, a complete network topology of actual neighbors is available to each node in the network.

Figure 8:
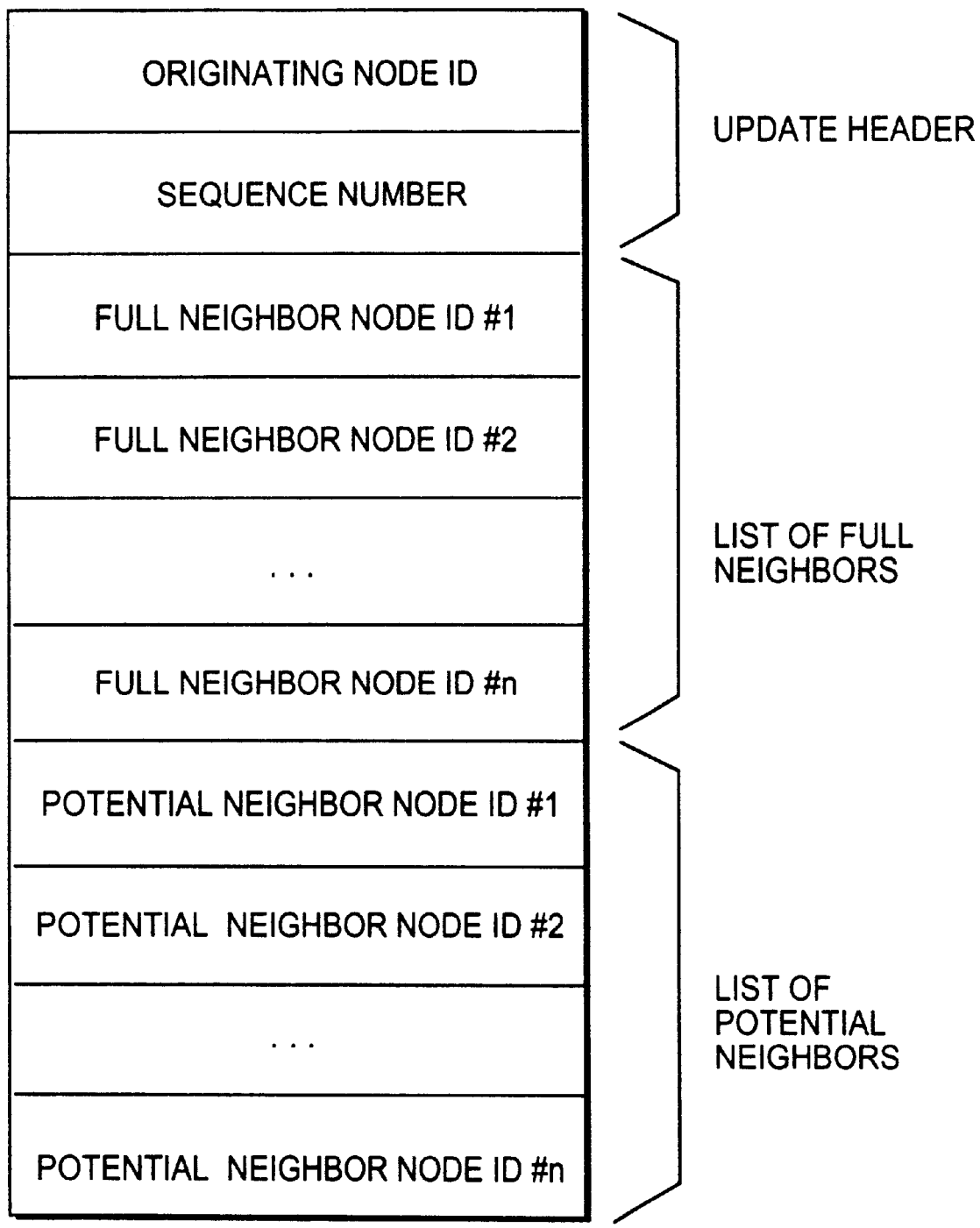
FIG. 8 is a diagram showing a format of a routing message.

A unique aspect of the present invention is that potential neighbor information can also be distributed through link-state type snapshots. In one arrangement, the potential neighbor information can be separately transmitted to other cluster heads at a slower rate than the link-state snapshots (e.g., information regarding actual neighbors), in order to reduce the volume of traffic through the network. Alternatively, the potential neighbor information can be piggybacked or transmitted with the link-state updates as described in FIG. 6A. In this regard, an alternative format for a link-state snapshot is shown in FIG. 8. The FIG. 8 snapshot includes a header, and both potential and actual neighbor information. Preferably, the list of actual and potential neighbors includes a node ID for each neighbor, and a metric associated with each neighbor node. In this manner, a complete network topology of both actual and potential neighbors is available to each node in the network.

Figure 10:
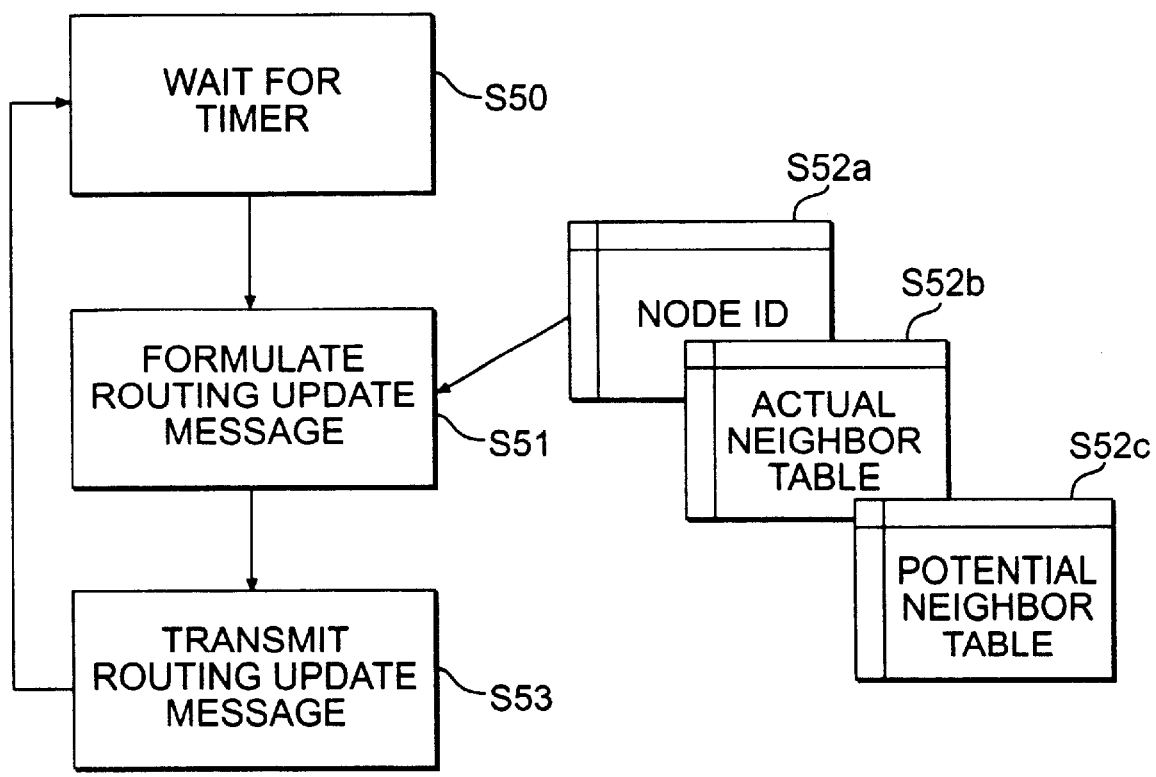
FIG. 10 is a flowchart illustrating a routing update for a snapshot.

The link-state snapshot of FIG. 8 can be distributed from a node based on the procedure illustrated in FIG. 10. As illustrated, a node waits for a predetermined time (S50) and then formulates an updated message (S51). The message can include node-ID, an Actual Neighbor Table, and a Potential Neighbor Table (S52a–S52c), as discussed below. After the message is. formulated, it is transmitted from the node (S53). As an alternative arrangement, transmission could occur on a random basis.

A metric is an expression or measure of how "expensive" it is to transmit across one link. Typically, a metric is calculated at the transmitting side of the link. For example, if a link exists between nodes A and C, the metric for a link from A to C is the sum of the cost of being processed at node A and the cost of being transmitted from node A to node C. Factors for determining a link metric may include queuing delays at a node, congestion through a node, and statistical delay probabilities caused by interference or disruption of a transmission signal between nodes, etc.

As discussed, each node can select the optimum route (e.g., a route with the "lowest cost") to transmit messages throughout the network. To facilitate selection, in one embodiment, a forwarding table is created to express the cost of forwarding messages. Since each node has a snapshot database (including actual and potential neighbors), a shortest path tree with itself as the root and all other nodes (via affiliated cluster heads) as branches is created by the node. The "length" of each link is given by the metric for that link, and a path metric is the sum of the lengths along that path. Once the tree is constructed, it is possible to generate a forwarding table that optimally indicates which "next-hop" node or which overall path having the lowest cost should be used for any giving destination node. This calculation can be performed via the shortest-path algorithms discussed above, for example. In this manner, each node can determine a transmission path through any of its affiliated nodes to optimally send or receive messages through the network.

Figure 3:
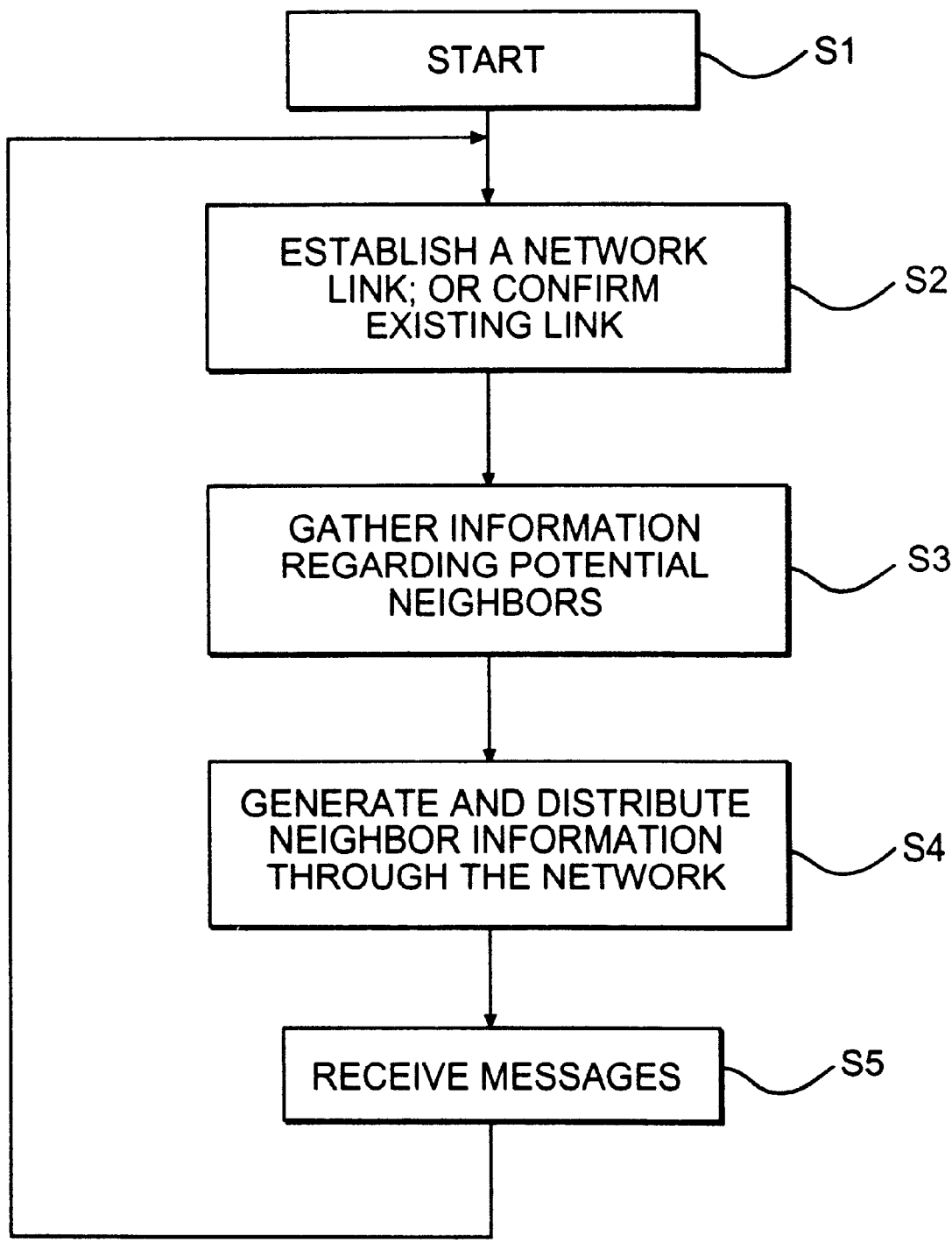
FIGS. 3–5 are flowcharts illustrating operational aspects of a communication node according to the present invention.

Operation of a communication node in the ad hoc network shown in FIGS. 2A and 2B will now be described with reference to the flowcharts of FIGS. 3 and 4. In FIG. 3, operation is commenced in step S1, and flows to step S2 where the node establishes a communication link with the network or, if a link is already established, verifies the link.

The node gathers information regarding potential neighbors (S3) from received beacon messages. The node can also determine potential neighbors by creating a network topology map, constructed with information received from other nodes, for example. Alternatively, the node can query potential neighboring nodes itself. The node compiles information regarding potential neighbor nodes and transmits this information through the network to each individual node (S4). Transmission can occur, for example, by the node issuing information to actual neighbor nodes for reissuance to other nodes in the network.

Figure 7:
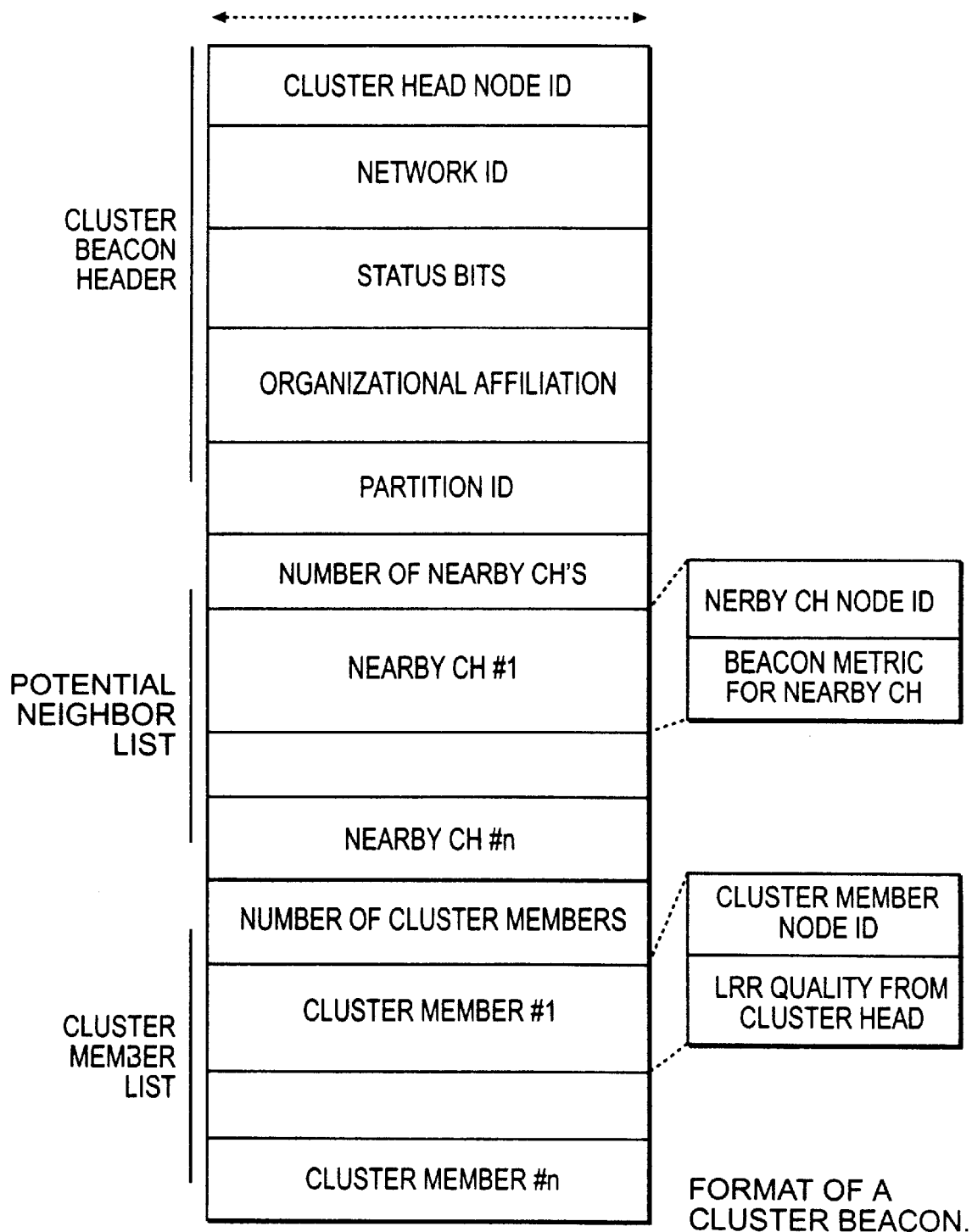
FIG. 7 is a diagram showing a format of a cluster beacon.

As previously discussed, a node periodically issues a beacon announcing its presence and supplying network information. FIG. 7 is a diagram illustrating a possible format for a cluster head beacon message (e.g., a beacon issued by a cluster head). The illustrated cluster head beacon includes three main categories of information; namely, a Cluster Beacon Header, a Potential Neighbor List, and a Cluster Member List.

The Cluster Beacon Header identifies the node issuing the beacon. The information can include a cluster head node ID, a network ID, the status of the node, organization affiliation (e.g., command, support, administrative function, etc.), and a partition ID (if any).

The Cluster Member List identifies those nodes that are affiliated with the cluster head. This member list can include non-gateway nodes (e.g., nodes a–d in FIG. 2A), gateway nodes (e.g., nodes C and E in FIG. 2A), or a combination of the two. The Cluster Member List includes fields directed to the number of cluster members and actual cluster member entries. The Number of Cluster Member field contains the current number of members that are affiliated with the cluster head, and the Cluster Member Entry field identifies the members that are currently affiliated with the cluster head. Each of the Cluster Member entries includes the cluster members' node ID, and a quality index calculated by the cluster head. The quality index allows other nodes in the network to evaluate the links between the particular cluster head and the cluster member.

The Potential Neighbor List can include fields related to node identification, a node-specific sequence number, and a list of potential neighbors. The information can also include a node identifier for each potential neighbor, and a metric describing the cost of linking that potential neighbor and the cluster head issuing the beacon. The node specific sequence number ensures that the most up-to-date list is used.

Returning to FIG. 3, the cluster head also receives cluster beacons (as well as link-state updates) from other network nodes regarding their potential neighbors (S5). As will be appreciated, the node could receive updates at any time, and is therefore not limited to receiving messages after first proceeding through steps 1–4.

Figure 5:
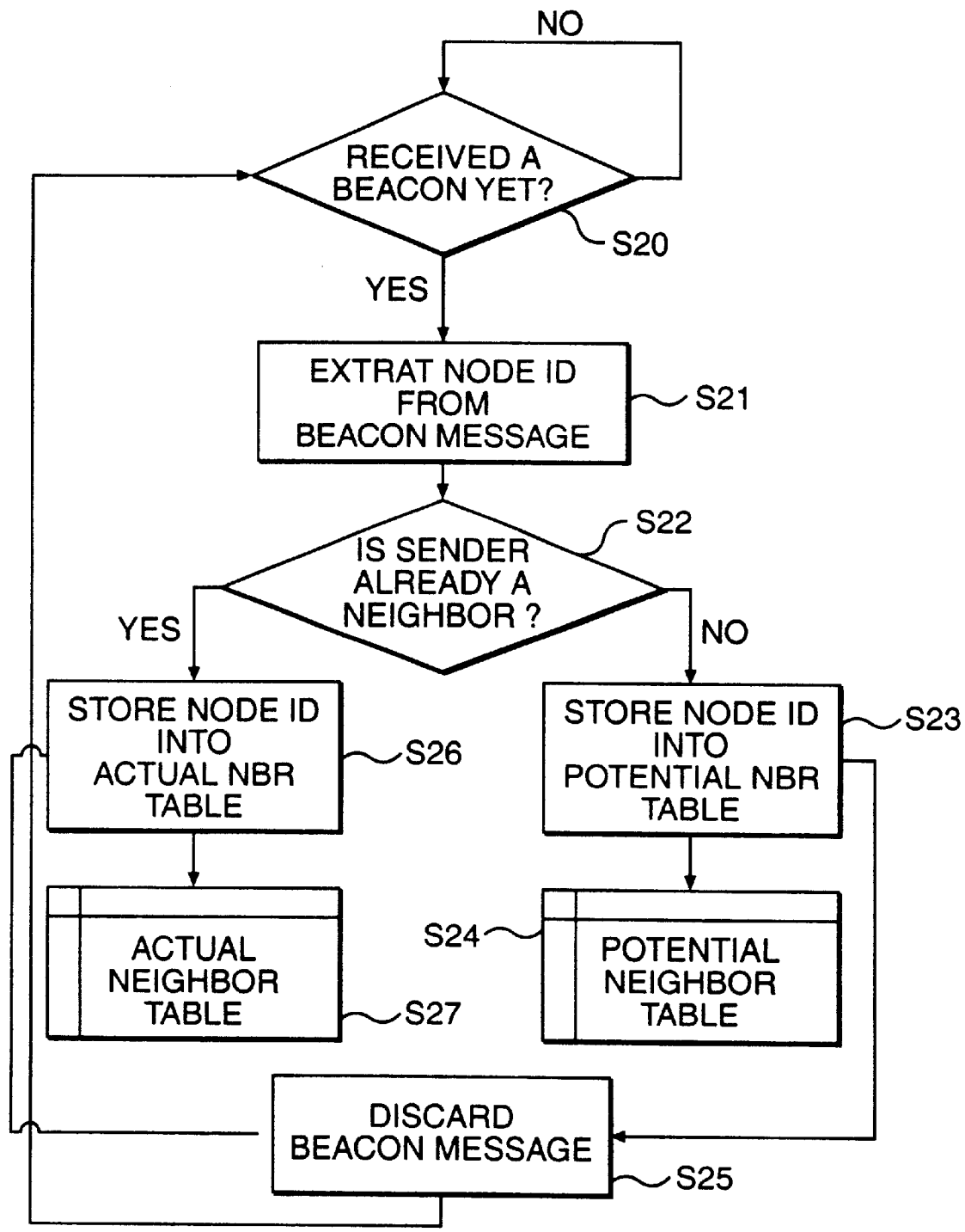

FIG. 5 is a flowchart illustrating how a node receives and processes a beacon message from a neighboring node. Once a beacon is received (S20), the node ID is extracted (S21). The node then determines if the sending node is already an actual neighbor (S22). Whether the sender node is already a neighbor can be determined by executing a database lookup in an Actual Neighbor Table for the beacon node ID. If the Id is found in the Table, the node is an actual neighbor.

If the node is already an actual neighbor, information from the beacon signal is stored (S26) and the Actual Neighbor Table is updated (or created) in step S27. If the sending node is not an actual neighbor, the beacon message is stored in a Potential Neighbor Table (S23) and the Potential Neighbor Table is updated (or created) in step S24. The beacon message is discarded once the information has been extracted or stored (S25).

Figure 4:
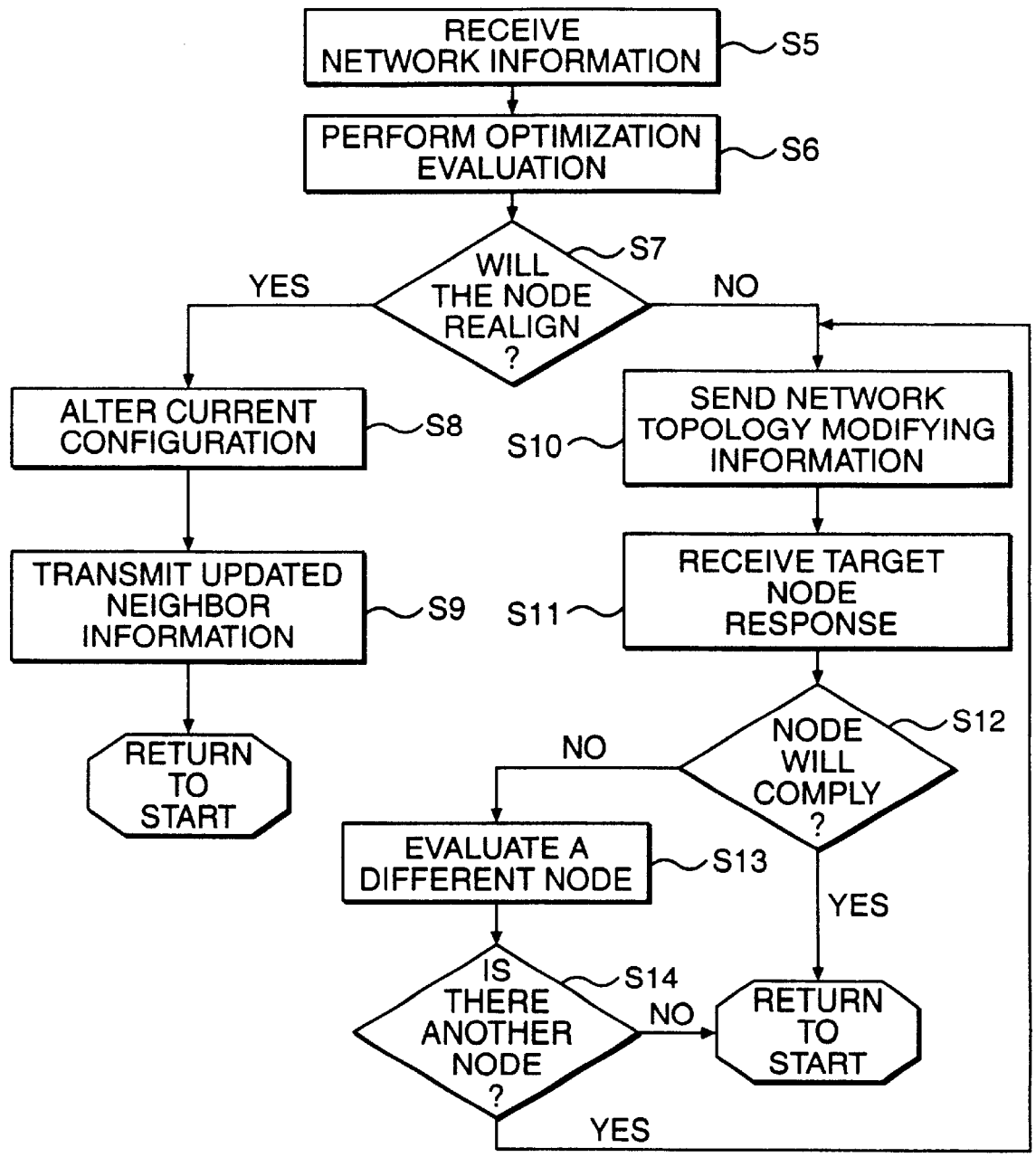

With reference to FIG. 4, after receiving potential neighbor information from the network (S5), the communication node evaluates various potential node configurations to optimize the network in step S6 of FIG. 4. Similar to the methods of determining lowest-cost for routing messages, as discussed above, cluster heads determine alternate network topologies based on an addition of potential neighbors to the network, for example.

In the evaluation, the node also can evaluate locally perceived problems, for example, a congested pathway or an overburdened node. The node determines if the network can be optimized by realigning its own affiliations (S7). For example, the node determines whether the network can be optimized by elevating a potential neighbor to an actual neighbor, or by realigning or relinquishing a current link with an actual neighbor node. With reference to FIG. 2A, node A may determine that elevating node B to an actual neighbor is less expensive than routing messages through nodes C and D. In this evaluation, node A utilizes a metric associated with a link between itself and node B, as well as the metrics relating to the network path A-C-D-B, to evaluate the cost of making node B an actual neighbor. In making its determination, node A can also evaluate the effect of the upgrade on the entry network, to ensure overall network optimization. If the upgrade will not enhance the network, node A may choose not to make the upgrade.

If a node can optimize the network by realigning itself, it will do so in step S8. Once the node's neighborhood has been changed, an update regarding new potential neighbors (as well as a new link-state snapshot) can be transmitted to the network. After transmission, flow returns to start (S1) in FIG. 3.

If the node cannot optimize the network by changing its own affiliation, flow continues from step S7 to step S10. Here, the node identifies a target node (or nodes) in the network, which can optimize the network by altering its affiliation. For example, with reference to FIG. 2A, node E may determine that messages routed to node B encounter a tremendous amount of congestion and delay when routing through node D. Node E may evaluate the path metrics associated with transmission through node A to node B, and determine that the potential path (e.g., E-A-B) is less expensive than the current path (e.g., E-D-B). In this case, node E cues or requests that the target node (node A) alter its affiliation by issuing network topology modifying information to that node. The illustrated embodiments show that flow continues to step S11, to await a response from the target node. As will be appreciated, flow could alternatively return to step S5 with essentially the same result.

If the target node (or nodes) is able to comply with the request (e.g., modify its network affiliations), flow returns to the start (S1) in FIG. 3. If the target node cannot comply, the node determines whether there is an alternative or substitute node (or nodes) which could alter its configuration to achieve the desired optimization (S13). If such a node exists, flow returns to step S10 where network topology modifying information can be sent to the newly targeted node. If such a node does not exist, flow returns to the start (S1).

Figure 9:
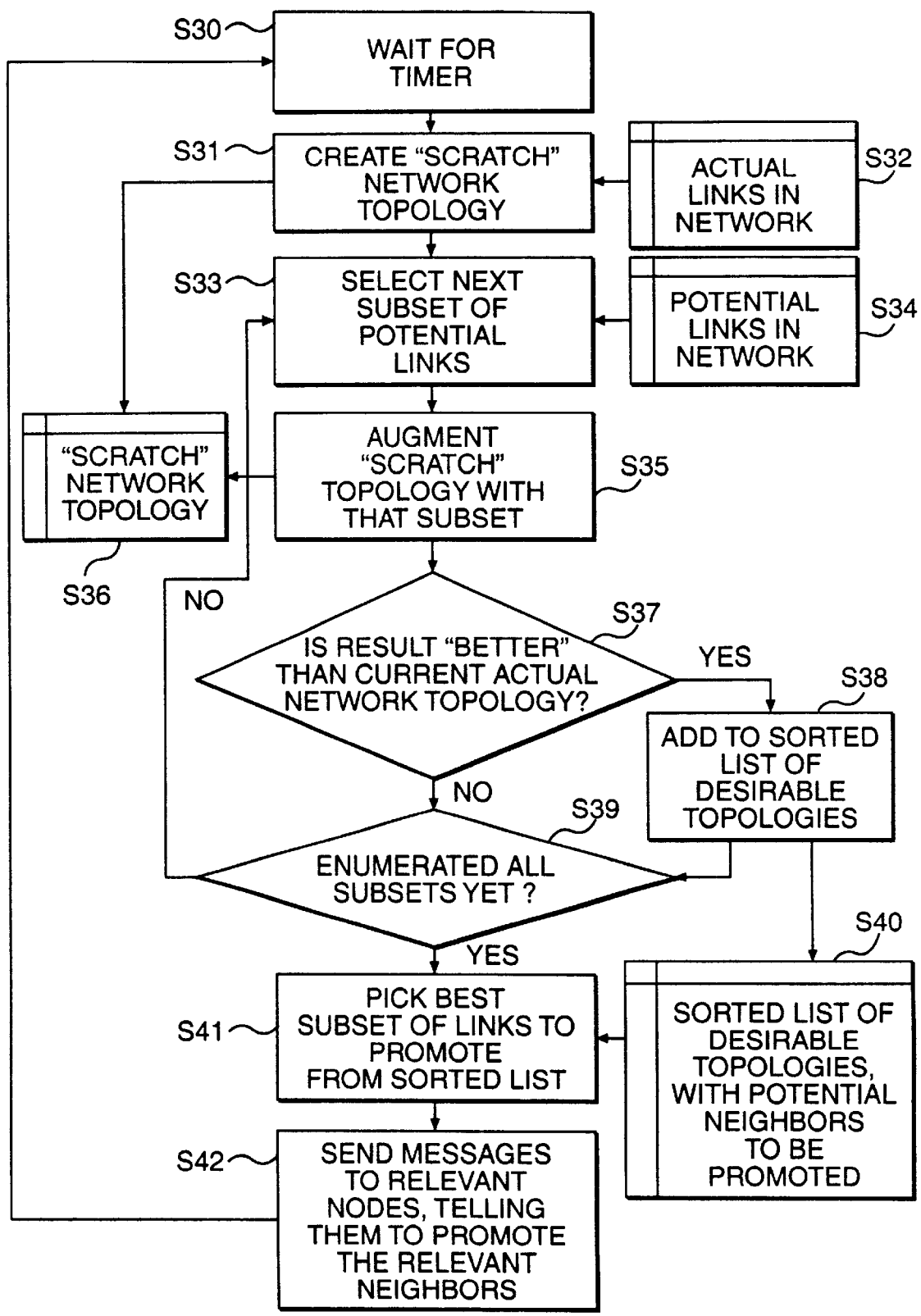
FIG. 9 is a flowchart illustrating a selection process for selecting which potential neighboring nodes should be promoted to actual nodes.

FIG. 9 is a flowchart illustrating a procedure of how a node determines which potential neighbors should be updated to full neighbor status. After a predetermined time (S30) the node creates a "scratch" network topology (S31) based on the Actual Neighbor Table (S32) of FIG. 5. The node then selects a subset of potential neighboring links from the Potential Neighbor Table (S34) to evaluate (S33). The node augments the scratch topology by including links with the potential neighbors from the subset (S35), and stores the suggested topology in step S36.

The node determines if the suggested topology is "better" than the current network topology (S37). There are many ways of measuring a "better" topology. One way to evaluate whether a change is "better" is to measure a network diameter. In general, a network with a smaller diameter is "better" than one with a larger diameter. The node might also perform a standard graph-theoretic algorithm to determine whether the proposed network is biconnected. A biconnected network is better than one than is singly connected, since a biconnected network has no single point of failure. Alternatively, the node can compare the overall metrics (as well as individual node metrics) of the suggested network topology with the actual network topology. The number of choices for determining a "better" network is large, and each alternative arrangement is intended to fall within the scope of this patent.

If the new topology is "better" than the current topology, it is added to a sorted list of desirable topologies (S38). A List of sorted topologies is maintained (S40) as the node iterates through possible combinations of promoting some potential neighbors into actual neighbors.

Operation continues to iterate until all possible subsets are evaluated (S39).

Alternatively, operation could continue for only a discrete subset of all possible combinations.

The overall best subset of new links is chosen from the list (S41) and a message is transmitted to the relevant nodes, requesting that they promote the relevant neighbors to actual neighbors (S42).

Hence, distributing some or all of the "potential neighbor" information to nodes in a network allows individual nodes to perform globally optimal selections of actual neighbors from potential neighbor sets.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

As will be appreciated, there are countless configurations for an ad hoc network, particular for a mobile network where member and gateway affiliations continuously change.

FIGS. 2A–2C only illustrate a few possible configurations, and in no way should be construed as limiting the application of the inventive apparatus and methods to other network configurations.

Whereas the illustrated embodiments use link-state routing as the underlying routing approach, this present invention would also provide advantages with other underlying approaches. In particular, the present invention would thrive in a centralized or distributed implementation of "route servers." In such a system, specialized nodes perform the path-determination computation for message flows through the network. If these nodes have potential-neighbor information available, they can attempt to modify the existing network topology to better optimize traffic flows by requesting that certain potential neighbors be made into full neighbors.

Some of the illustrated examples are described from the perspective of a cluster head. However, as will be appreciated, cluster members can also receive and transmit data regarding potential neighbors, including information regarding their own potential neighbors. For example, potential neighbor information could be included in an affiliation snapshot. Similarly, cluster members can issue recommendations for network changes, and determine potential and alternative network topologies. Likewise, the inventive features are applicable to a network that is not organized into groups or clusters.

As will be appreciated, the operation illustrated in FIG. 9 can be executed by all nodes in the network, or by only certain nodes (e.g., "cluster heads"). Alternatively, a single centralized node or site can perform the network optimization.

The present invention can also optimize a system using packet message flows implemented atop an underlying switched virtual-circuit network (e.g., IP over ATM, or other Multi-Protocol Label Switched messaging systems). Here IP routers would form neighbor relationships (via ATM or MPLS circuits) with some subset of their potential "one IP hop" neighbors, but advertise all possible neighbors. As needed, full neighbor relationships would be formed in response to traffic flows, i.e., circuits would be set up to convey messages between one IP router and a potential "one IP hop" neighbor. Such circuits would be torn down when no longer needed (i.e., when it would be more efficient to remove this neighbor relationship from the IP network topology).

As will be appreciated, many different types of systems, including a wireless mobile communications network, can utilize the features of the present invention. The inventive methods can also be embodied on computer executable code that is stored on a computer readable medium, for example, a floppy disk, hard drive, removable media, optical memory, magneto-optical memory, RAM, ROM, flash memory, memory sticks, and the like.

What is claimed is:

1. A network node apparatus comprising:
   a memory which stores link-state information regarding neighboring nodes in a network;
   a processor which (i) determines a list of potential neighbor nodes with which the network node could communicate directly but to which the network node is not currently linked, and (ii) determines cost-of-transaction information regarding each potential neighbor node on the list of potential neighbor nodes; and
   a transmitter which transmits the list of potential neighbor nodes and the determined cost-of-transaction information to the network.

2. A programmable computer for use in operating a communication node in an ad hoc communication network, the communication node capable of issuing and receiving messages, each node having neighboring nodes including actual neighboring nodes to which the communication node is linked and potential neighbor nodes with which the communication node could communicate directly but to which the communication node is not currently linked, said programmable computer comprising:
   at least one memory including at least one region for storing computer executable program code; and
   a processor for executing the program code stored in said memory,
   wherein the program code includes code to receive at the node, network information from other nodes in the network, code to generate in the node, information of potential neighboring nodes responsive to the received network information from other nodes of the network, and code to issue a network information message from the node to the other nodes of the network, which network information message includes information of the potential neighboring nodes.

3. In a communication network having plural nodes capable of receiving and issuing messages, each node having neighbor nodes including actual neighboring nodes to which the node is linked and potential neighbor nodes with which the node could communicate directly but to which the node is not currently linked, a method of distributing node information comprising the steps of:
   receiving at a node, network information from other nodes in the network;
   generating in the node, information of potential neighboring nodes responsive to the received network information from other nodes of the network; and
   issuing a network information message from the node to the other nodes of the network, which network information message includes information of the potential neighboring-nodes.

4. The method according to claim 3, wherein the potential neighboring node information includes a node identifier for the node, a node specific sequence number for the node and a list of potential neighbors of the node.

5. The method according to claim 4, wherein the information for each potential neighboring node includes a metric corresponding to a cost of linking the potential neighbor and the node.

6. The method according to claim 3, wherein the information for each potential neighboring node includes a metric corresponding to a serviceability of a link between the potential neighbor and the node.

7. The method according to claim 3, wherein the network information message which includes the information of potential neighboring nodes is issued from the node less frequently than other network information messages.

8. The method according to claim 7, wherein the network information message that includes the information of potential neighboring nodes is issued in response to an occurrence of a predetermined event.

9. The method according to claim 8, wherein the predetermined event comprises at least one of the node realizing a change in the potential neighbors, a change in a state of a potential neighboring node, and an occurrence of a predetermined time-period.

10. The method according to claim 3, wherein the network information messages of the node are issued to the actual neighboring nodes for reissuance to other nodes of the network.

11. The method according to claim 3, further comprising the steps of:
    storing network topology information in the node;
    processing the received network information messages including the information of potential neighboring nodes to modify the network topology information; and
    issuing network information messages including the network topology modifying information.

12. The method according to claim 11, wherein the network topology modifying information includes information corresponding to network reconfiguration.

13. The method according to claim 11, wherein the network reconfiguring information includes at least one of changing potential neighboring nodes to actual neighboring nodes and changing actual nodes to potential neighboring nodes.

14. A method of operating a mobile station for use in a wireless mobile communication network, the network employing a plurality of mobile stations, each of the plurality of stations capable of transmitting and receiving communication signals said method comprising the steps of:
    receiving at the mobile station, network information from other stations in the network;
    generating in the mobile station, information of potential neighboring stations with which the mobile station could communicate directly but to which the mobile station is not currently linked, that are responsive to the received network information from other stations of the network; and
    issuing a network information message from the mobile station to the other stations of the network, which network information message includes information of the potential neighboring stations.

15. The method according to claim 14, wherein the potential neighboring mobile station information includes a station identifier for the mobile station, a station specific sequence number for the mobile station and a list of potential neighbors of the mobile station.

16. The method according to claim 15, wherein the information for each potential neighboring station includes a metric corresponding to a cost of linking the potential neighbor and the mobile station.

17. The method according to claim 14, wherein the information for each potential neighboring station includes a metric corresponding to a serviceability of a link between the potential neighbor and the mobile station.

18. The method according to claim 14, wherein the network information message that includes the information of potential neighboring stations is issued from the mobile station less frequently than other network information messages.

19. The method according to claim 18, wherein the network information message that includes the information of potential neighboring stations is issued in response to an occurrence of a predetermined event.

20. The method according to claim 19, wherein the predetermined event comprises at least one of the mobile station realizing a change in the potential neighbors, a change in a state of a potential neighboring station, and an occurrence of a predetermined time-period.

21. The method according to claim 14, wherein the network information messages of the mobile station are issued to the actual neighboring stations for reissuance to other stations of the network.

22. The method according to claim 14, further comprising the steps of:
    storing network topology information in the mobile station;
    processing the received network information messages including the information of potential neighboring stations to modify the network topology information; and
    issuing network information messages including the network topology modifying information.

23. The method according to claim 22, wherein the network topology modifying information includes information corresponding to network reconfiguration.

24. The method according to claim 22, wherein the network reconfiguring information includes at least one of changing potential neighboring stations to actual neighboring stations and changing actual stations to potential neighboring stations.

25. Computer executable code stored on a computer readable medium, the code for operating a communication node in a communication network having plural nodes capable of receiving and issuing messages, each node having neighboring nodes including actual neighboring nodes to which the communication node is linked and potential neighbor nodes with which the communication node could communicate directly but to which the communication node is not currently linked, said code comprising:
    code to receive at the node, network information from other nodes in the network;
    code to generate in the node, information of potential neighboring nodes responsive to the received network information from other nodes of the network; and
    code to issue a network information message from the node to the other nodes of the network, which network information message includes information of the potential neighboring nodes.

26. A network node apparatus comprising:
    means for storing link-state information regarding neighboring nodes in a network;
    means for determining a list of potential neighbor nodes with which the network node apparatus could communicate directly but to which the network node is not currently linked and cost-of-transaction information regarding each node on the list of potential neighbor nodes; and
    means for transmitting the list of potential neighbor nodes and the determined cost-of-transaction information to the network.

* * * * *